(12) United States Patent
Morrison

(10) Patent No.: US 11,707,020 B1
(45) Date of Patent: Jul. 25, 2023

(54) COTTON BALE STRAPPING APPARATUS AND METHODS OF USE

(71) Applicant: Arland Morrison, Delhi, CA (US)

(72) Inventor: Arland Morrison, Delhi, CA (US)

( * ) Notice: Subject to any disclaimer, the term of this patent is extended or adjusted under 35 U.S.C. 154(b) by 0 days.

(21) Appl. No.: 17/585,503

(22) Filed: Jan. 26, 2022

(51) Int. Cl.
*A01F 15/08* (2006.01)
*B65B 13/04* (2006.01)

(52) U.S. Cl.
CPC .......... *A01F 15/08* (2013.01); *A01F 15/0858* (2013.01); *B65B 13/04* (2013.01)

(58) Field of Classification Search
CPC ......... B65B 13/04; B65B 13/06; B65B 13/18; B65B 13/20; A01F 15/08; A01F 15/0858; A01F 15/14
See application file for complete search history.

(56) References Cited

U.S. PATENT DOCUMENTS

| | | |
|---|---|---|
| 3,720,158 A | 3/1973 | Sauer et al. |
| 3,834,297 A | 9/1974 | Huson |
| 3,948,021 A | 4/1976 | Buck, Jr. et al. |
| 3,998,150 A | 12/1976 | Buck, Jr. et al. |
| 4,010,680 A | 3/1977 | Buck, Jr. et al. |
| 4,071,138 A | 1/1978 | Wright |
| 4,154,158 A | 5/1979 | Lesllie et al. |
| 4,161,911 A | 7/1979 | Schafer et al. |
| 4,391,186 A | 7/1983 | Davis |
| 4,512,252 A | 4/1985 | Goldhammer |
| 4,548,131 A | 10/1985 | Williams |
| 4,566,380 A | 1/1986 | Clostermeyer et al. |
| 4,611,534 A | 9/1986 | Kudlicka et al. |
| 4,744,310 A | 5/1988 | Moore |
| 4,794,671 A | 1/1989 | Goldman |
| 4,805,528 A | 2/1989 | Rogers et al. |
| 4,929,141 A | 5/1990 | Keesey et al. |
| 4,951,562 A * | 8/1990 | Ribaldo ............... B65B 13/20 100/25 |
| 5,456,075 A | 10/1995 | Meijer |

(Continued)

FOREIGN PATENT DOCUMENTS

| | | |
|---|---|---|
| RU | 2634921 | 11/2017 |
| WO | 9937474 | 7/1999 |
| WO | 2006026375 | 9/2006 |

OTHER PUBLICATIONS

English Abstract of RU2634921, Retrieved on Feb. 1, 2020, "https://worldwide.espacenet.com/patent/search/family/049080928/publication/RU2634921C2?q=RU2634921".

(Continued)

*Primary Examiner* — Jimmy T Nguyen

(74) *Attorney, Agent, or Firm* — Sierra IP Law, P.C.; Mark D. Miller

(57) ABSTRACT

The present invention provides improved throughput in cotton baling machines by utilizing an electronically actuated apparatus for reliably, efficiently and precisely moving a chute frame into and out of position adjacent to a compressed cotton bale. Embodiments of the invention may include an electronic actuator that may be operated using a programmable logic control (PLC), and a control shaft having at least three distinct stops corresponding to raised, lowered and intermediate positions of the chute frame. Embodiments of the invention may be used to replace existing pneumatic apparatus, and may include an adapter for installing an electronic actuator to the mounts of the replaced pneumatic piston.

9 Claims, 14 Drawing Sheets

(56) References Cited

U.S. PATENT DOCUMENTS

| | | |
|---|---|---|
| 6,628,996 B1 | 9/2003 | Stamps et al. |
| 6,628,998 B2 | 9/2003 | Stamps et al. |
| 6,633,798 B2 | 10/2003 | Daniel et al. |
| 6,705,214 B1 | 3/2004 | Stamps |
| 6,711,994 B1 | 3/2004 | Daniel et al. |
| 6,837,155 B2 | 1/2005 | Daniel et al. |
| 6,941,740 B2 | 9/2005 | Fox et al. |
| 7,093,535 B2 * | 8/2006 | Daniel .................... B65B 27/12 53/589 |
| 7,121,195 B2 | 10/2006 | Daniel et al. |
| 7,124,679 B2 | 10/2006 | Daniel et al. |
| 7,395,952 B2 | 7/2008 | Daniel et al. |
| 7,421,944 B1 * | 9/2008 | Flaum .................... B65B 27/12 100/29 |
| 7,526,995 B2 | 5/2009 | Actis et al. |
| 7,568,329 B2 | 8/2009 | Cranston, III et al. |
| 7,841,272 B2 | 11/2010 | Actis et al. |
| 8,485,092 B2 | 7/2013 | Actis |
| 9,883,632 B2 | 2/2018 | Rizzon et al. |
| 9,930,836 B2 | 4/2018 | Keller et al. |
| 10,058,037 B2 | 8/2018 | Kraus |
| 10,238,041 B2 | 3/2019 | Keller |
| 10,271,481 B2 | 4/2019 | Rizzon et al. |
| 10,249,940 B2 | 5/2019 | Weber et al. |
| 10,306,839 B2 | 6/2019 | Adams et al. |
| 10,820,523 B2 | 11/2020 | Kraus |
| 10,827,684 B2 | 11/2020 | Roberge |
| 10,934,143 B2 | 3/2021 | McAfee et al. |
| 11,066,201 B2 | 7/2021 | Adams et al. |
| 11,116,140 B2 | 9/2021 | Adams et al. |
| 11,122,745 B2 | 9/2021 | Adams et al. |
| 2001/0005978 A1 * | 7/2001 | Tipton .................... B65B 13/20 53/529 |
| 2005/0016394 A1 | 1/2005 | McDowell |
| 2008/0141873 A1 | 6/2008 | Gemgross et al. |
| 2012/0017780 A1 * | 1/2012 | Haberstroh ............. B65B 27/12 100/20 |
| 2015/0373912 A1 | 12/2015 | Wallace |
| 2015/0379785 A1 | 12/2015 | Brown, Jr. et al. |
| 2021/0163164 A1 | 6/2021 | Johnson |

OTHER PUBLICATIONS

Signode, Revolution Z634 Down-Packer (2021), "https://www.signode.com/en-us/productslist/revolution-z634-down-packer/".

Signode, Revolution Z634 Up-Packer (2021), "https://www.signode.com/en-us/productslist/revolution-z634-up-packer/".

* cited by examiner

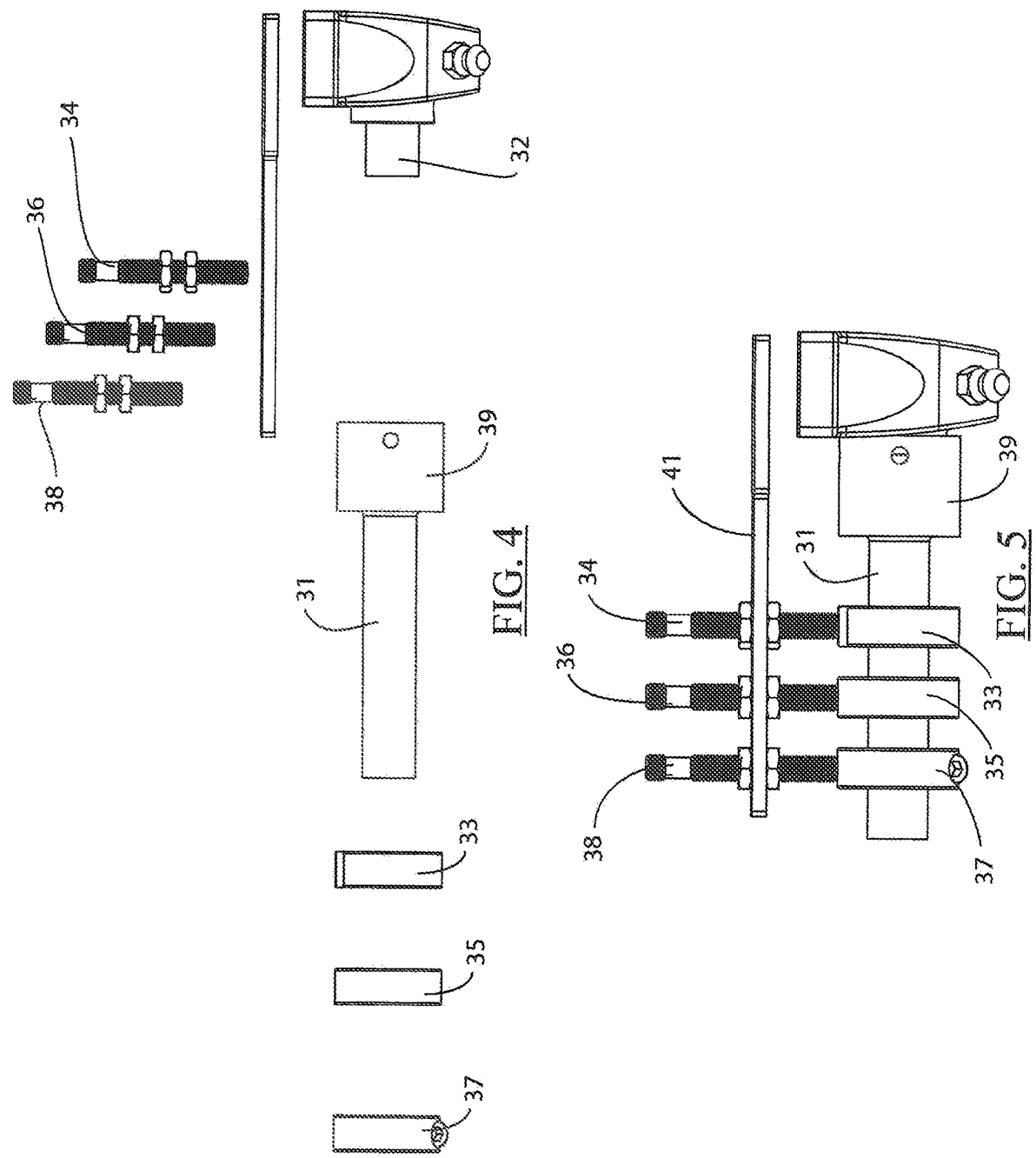

COTTON BALE STRAPPING APPARATUS AND METHODS OF USE

FIELD OF THE INVENTION

The present invention relates to cotton baling machines, and more particularly to an electronically actuated assembly for positioning one or more strap guides (chutes) of a cotton bale strapping assembly that is used to strap a compressed bale of cotton, and methods of using the same.

BACKGROUND

In the cotton industry, the process of strapping a bale involves introducing a large quantity of cotton fibers into a press, compressing the fibers into a compact bale, strapping the compressed bale so that it stays in a compressed condition, and then discharging the strapped bale from the machine. One way to secure a bale after the bale has been pressed involves using flat thermoplastic strapping material.

In existing cotton baling machines, while the cotton bale is in a compressed state, a plurality of straps are wrapped around the bale, and the ends of the straps are connected or sealed together forming continuous bands around the bale which prevent the bale from expanding. These straps may be fed around the compressed cotton bale using a plurality of tracks or chutes that extend circumferentially about the cotton bale. A feeder unit having a plurality of chutes is ordinarily provided on one side of the area where the bale is compressed, a corresponding plurality of chutes are provided above and/or below this area, and a movable guide or chute frame having another plurality of corresponding chutes is provided on the other side of the area. Once a cotton bale has been compressed, the movable chute frame may be lowered into place along a side of the bale such that the chutes at the top and bottom of the bale are aligned with corresponding chutes on the chute frame. Straps are then fed from the feeder unit on the opposite side of the bale into the chutes below (or above) the cotton bale itself, through the chutes on the chute frame, and back around the cotton bale using the chutes above (or below) the bale. The straps are propelled by the feeder unit around the bale back to a position where their free ends may be manipulated so that the bale may be tightly strapped and tied. The strapped bale is then discharged, from the machine and more cotton is moved into place for compression into a bale and strapping.

Existing machines use pneumatic (air) pistons or cylinders to raise and lower strapping chute frames. Such pneumatic devices suffer from a number of drawbacks and potential failures, as well as safety issues. Among other things, variations in air quality (e.g. dust or debris—especially airborne cotton fibers), air temperature, air quality, humidity and moisture can affect the operation of pneumatic devices by causing failures in hoses, valves, seals and other component parts. As a result, pneumatic devices have high failure rates and are frequently replaced over the life of a machine. In addition, pneumatic devices are not capable of precisely positioning an object attached to the device, because even after air has been shut off, there may be changes in pressure and/or leaks that may cause the object to continue to move even after air has been shut off. Finally, pneumatic devices present safety issues in that a cut in an air line can cause the device to drop, leading to potential injury or property damage. Thus, there is a need for an alternative to pneumatic devices to improve reliability, safety and efficiency.

It is to be appreciated that the number of bales that may be compressed and strapped by such a machine will be limited by the time it takes to complete the compression and strapping operations. In many cases, the strapped bale is discharged from the machine on the same side as the movable chute frame, since the feeder unit is permanently installed on the opposite side. This means that after the strapping has been completed, the discharge operation must wait until the chute frame has moved out of the way. While this delay may be momentary for each individual strapped bale, over the course of hours or days, these delays can significantly affect the throughput of the cotton baling machine. As a result, there is an ongoing need to improve the reliability, efficiency and throughput of such machines.

SUMMARY OF THE INVENTION

Embodiments of the present invention provide improved throughput in cotton baling machines by utilizing an electronically actuated apparatus for reliably, efficiently and precisely moving a chute frame into and out of position adjacent to a compressed cotton bale. Embodiments of the invention may include an electronically controlled motor driving a linear actuator that may be operated using a programmable logic control (PLC), and a control shaft having one or more distinct stops which may correspond to raised, lowered and intermediate positions of the chute frame. Embodiments of the invention may be used to replace existing pneumatic apparatus and may include an adapter for installing an electronic actuator to the mounts of the replaced pneumatic piston.

The present invention is designed to be attached to an existing cotton baling machine, and is used in conjunction with an existing strap feeder to attach straps to a compressed cotton bale. The bailing machine first compresses the cotton into a bale in a compression area. On one side of the compression is an existing strap feeder. Embodiments of the present invention are provided on the opposite side of the compression area from the strap feeder. Once a cotton bale has been compressed, an embodiment of the present invention assists in feeding straps from the feeder around the cotton bale for securement.

Embodiments of the invention include an electronically controlled actuator assembly and related parts that are mounted adjacent to a compression area of a cotton baling machine on a side of the machine opposite from a strap feeder. In embodiments of the invention, one end of the actuator may be pivotally mounted to the bailing machine adjacent to and above the compression area. Embodiments of the actuator include a movable rod that may be extended out of or retracted into the actuator. An outer end of the rod is designed to be pivotally attached to a movable frame which may be pivotally attached to the bailing machine just below the actuator, but above the compression area. Embodiments of the frame support a plurality of tracks or guides (chutes) which correspond to similar tracks or guides (chutes) of the strap feeder. When the frame is in a lowered position, straps may be fed from the strap feeder through the chutes on the frame and back to the strap feeder, thereby encircling a cotton bale in the compression area for securement.

In embodiments of the invention, retraction of the actuator rod may cause the frame supporting the strap guides (chutes) to pivot upward so that it is raised up and out of the way, allowing for a strapped cotton bale to be discharged from the compression area. In some embodiments, full retraction of the rod may pivot the frame up to a generally horizontal orientation. Similarly, extension of the actuator rod may cause the frame to pivot down so that it is next to the compression area. In some embodiments, full extension of the rod may pivot the frame down to a generally vertical orientation.

In embodiments of the invention, the frame supporting the guides may be pivotally attached to a rotatable shaft that is mounted to the side of the baling machine. Embodiments of this shaft may be connected to another collinear shaft that extends out from one end. In these embodiments, a plurality of stops may be provided on the outwardly extending collinear shaft, each stop having an associated sensor. In operation, the actuator rod may be extended or retracted, causing the frame to be lowered or raised, and causing rotation of the shaft supporting the frame. This also rotates the collinear shaft. During this rotation, if one of the sensors detects that it has reached one of the stops on the collinear shaft, it may send a signal to a controller which in turn sends a signal to stop the extension or retraction of the actuator rod, thereby stopping movement of the frame and guides. It is to be appreciated that stops may be provided for the fully extended and fully retracted positions of the frame, and that any number of intermediate stops may be provided to stop the extension or retraction of the frame at any desired location.

In some embodiments, the actuator rod may be moved to a third position that is between the fully extended and fully retracted positions. This position may be associated with one or more stops on the collinear shaft. In this third position, the frame and strap guides may be raised up high enough to allow a strapped cotton bale to be discharged from the machine without contacting the frame or strap guides. This third position allows the frame and strap guides to be lowered more reliably after a cotton bale has been discharged below them, since they do not have to travel the entire distance from the fully retracted position. Embodiments of the present invention allow for a precise stopping point for this third position, leading to improved reliability and efficiency, and also saving time by reducing the delay between compression and discharge of consecutive cotton bales.

In embodiments of the invention, a unique trunnion is used to pivotally attach a bottom of the actuator to a side of a cotton baling machine. In these embodiments, the trunnion may be designed to engage with existing support openings on the bailing machine that formerly supported a pneumatic or other type of actuator. This allows embodiments of the invention to be more easily retrofitted onto existing cotton baling machines.

Embodiments of the actuator may include a rod that may be slidably extended or retracted from the actuator. Other embodiments of the actuator may include a rod having a helical external surface (like a screw) such that turning the rod in one direction causes it to extend, and turning it in the other direction causes it to retract. In these embodiments, an electronic motor may be provided with the actuator to turn the rod. In some embodiments, the motor may be in the form of an electronic step motor or an integrated servo motor that is capable of holding the rod in a given position when the motor is not active. An optional brake may also be provided to assure that the rod does not extend or retract in the event that the servo or step motor faults for any reason and fails to hold the rod in place.

In one aspect of the invention, an assembly for positioning one or more strap chutes of a cotton bailing machine is provided that comprises a frame for supporting a plurality of strap chutes wherein an upper end of the frame is attached to a first shaft that is pivotally mounted on a side of a cotton bailing machine; a trunnion pivotally attached between a pair of outwardly extending flanges located above the pivotal mount of the frame, the trunnion having a central opening therein; an electronic actuator attached to the trunnion, the actuator including a movable rod that extends through the opening and wherein an end of the rod is pivotally attached to the frame; a second shaft attached to and collinear with the first shaft; at least one adjustable stop provided on the second shaft; at least one sensor, each sensor being associated with one of the adjustable stops; and a controller in communication with the actuator and the sensor. This aspect may further comprise an electronic motor attached to the actuator and in communication with the controller wherein operation of the motor causes the movable rod of the actuator to extend or retract. This aspect may further comprise a brake on said actuator in communication with said controller for preventing movement of said rod. In this aspect, the stop may comprise a surface feature that is detectable by the sensor. In another aspect, the surface feature may comprise an optically detectable sticker. In another aspect, the stop may comprise a cylindrical bearing that may be engaged with the second shaft, with the bearing having a surface feature that is detectable by the sensor. In another aspect, the surface feature may comprise a recess in the bearing, a tab on the bearing, or an optically detectable sticker on the bearing.

Another aspect of the invention may include a method for positioning one or more strap guides of a cotton bailing machine comprising the steps of: moving a frame supporting a plurality of strapping chutes to a lowermost position adjacent to a compressed bale of cotton using an electronic actuator and rod such that the strapping chutes align with other strapping chutes on the cotton bailing machine to allow straps to be sent through all of said chutes; then, after straps have been sent through the chutes, retracting the frame using said electronic actuator and rod to an uppermost position to allow a first compressed cotton bale to be discharged from the machine; then, after the first compressed cotton bale has been discharged from the machine, and while a subsequent cotton bale is being compressed by the machine, moving the frame to an intermediate position between the lowermost and the uppermost positions; and then repeating the steps above for subsequent bales.

It is therefore an object of the present invention to provide an electronically actuated apparatus for, efficiently and precisely moving a chute frame into and out of position adjacent to a compressed cotton bale in a cotton baling machine.

It is also an object of the present invention to provide methods and apparatus for improving the throughput of cotton baling machines by reliably moving a cotton bale chute frame into and out of position so as to allow prompt discharge of strapped cotton bales.

It is also an object of the present invention to replace an existing pneumatic apparatus with an electronic apparatus that more reliably, efficiently and precisely moves a cotton bale chute frame into and out of position in a cotton baling machine.

It is also an object of the present invention to retrofit an existing pneumatic chute frame of a cotton baling machine with an electronically actuated apparatus for reliably, efficiently and precisely moving the chute frame into and out of position that includes either (a) a programmable logic controller that is compatible with the controls of the existing machine, or (b) software that may be loaded into the controller of the existing machine.

It is also an object of the present invention to provide an electronically actuated apparatus for reliably, efficiently and precisely moving a chute frame into and out of position adjacent to a compressed cotton bale in a cotton baling machine having a control mechanism with at least three distinct stops corresponding to raised, lowered and intermediate positions of the chute frame.

It is also an object of the present invention to provide a safer and more reliable alternative to existing pneumatic devices used to position strapping chute frames.

Additional aspects and objects of the invention will be apparent from the detailed descriptions and the claims herein.

BRIEF DESCRIPTION OF THE DRAWINGS

FIG. 4 is an exploded top view of a control shaft according to an embodiment of the present invention.

FIG. 5 is an assembled perspective view of the embodiment of FIG. 4.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Figure 9:
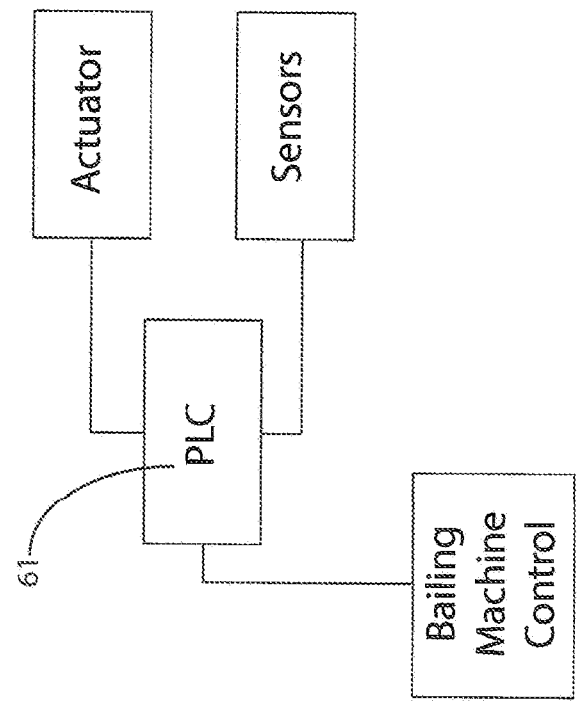
FIG. 9 is a schematic diagram of an embodiment of the invention.
Figure 8:
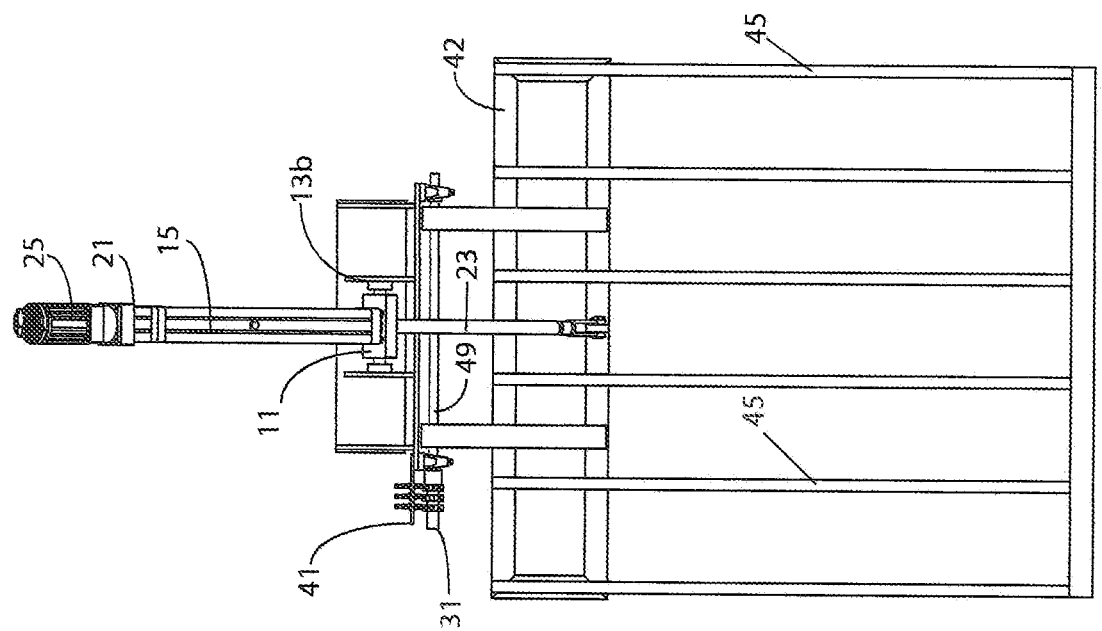
FIG. 8 is a side view of a fully extended chute frame assembly according to an embodiment of the present invention.
Figure 10:
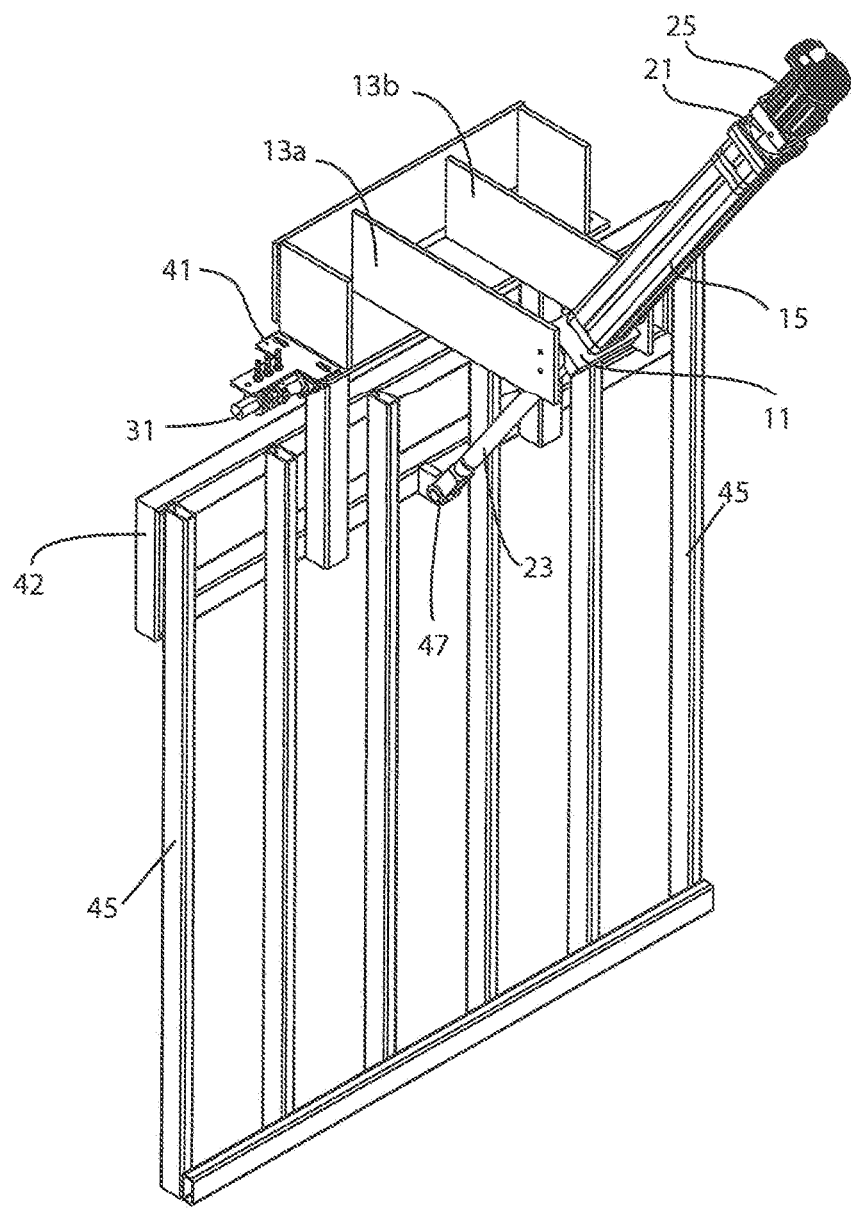
FIG. 10 is a perspective view of a fully extended chute frame assembly according to an embodiment of the present invention.
Figure 12:
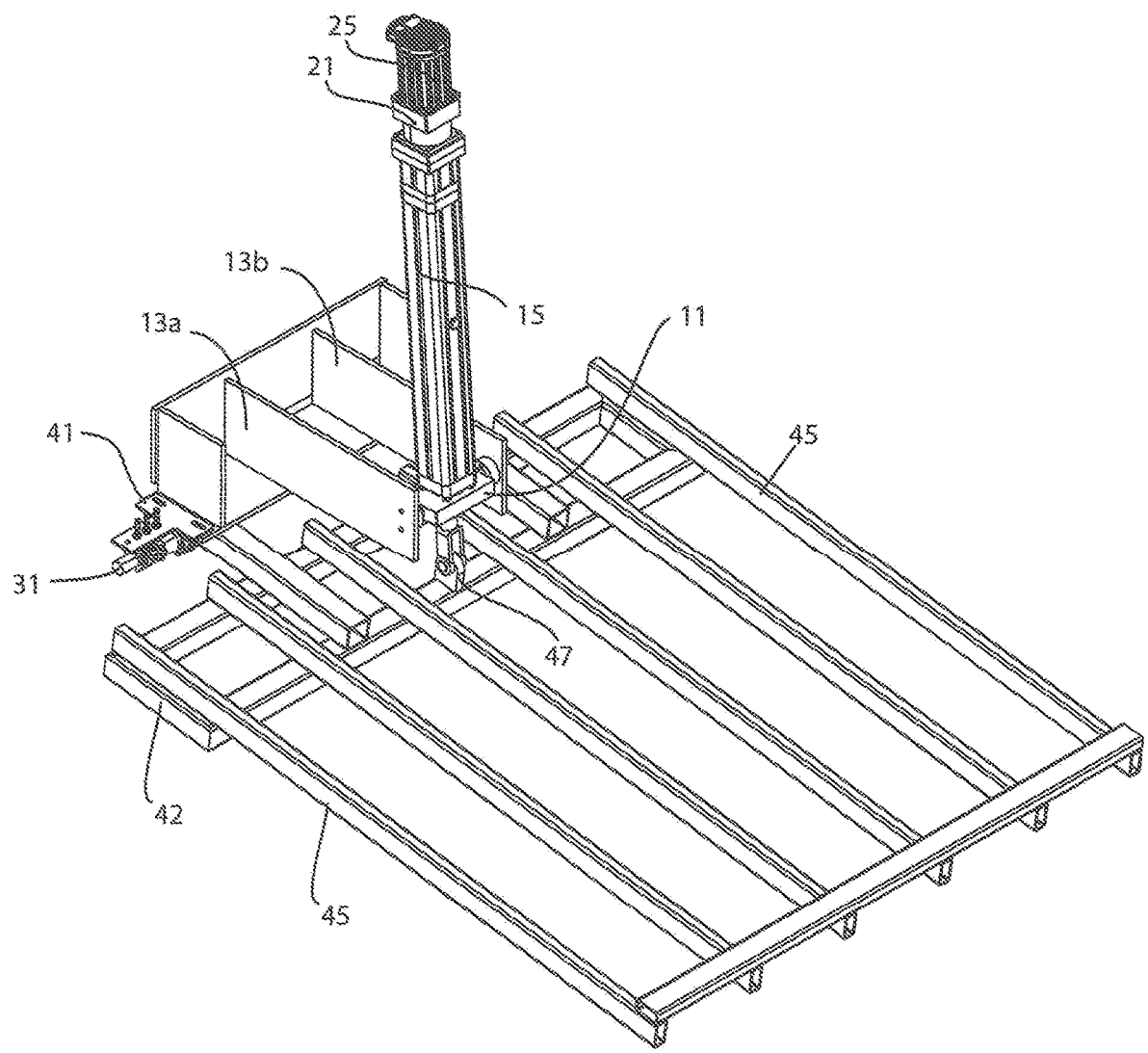
FIG. 12 is a perspective view of a fully retracted chute frame assembly according to an embodiment of the present invention.
Figure 13:
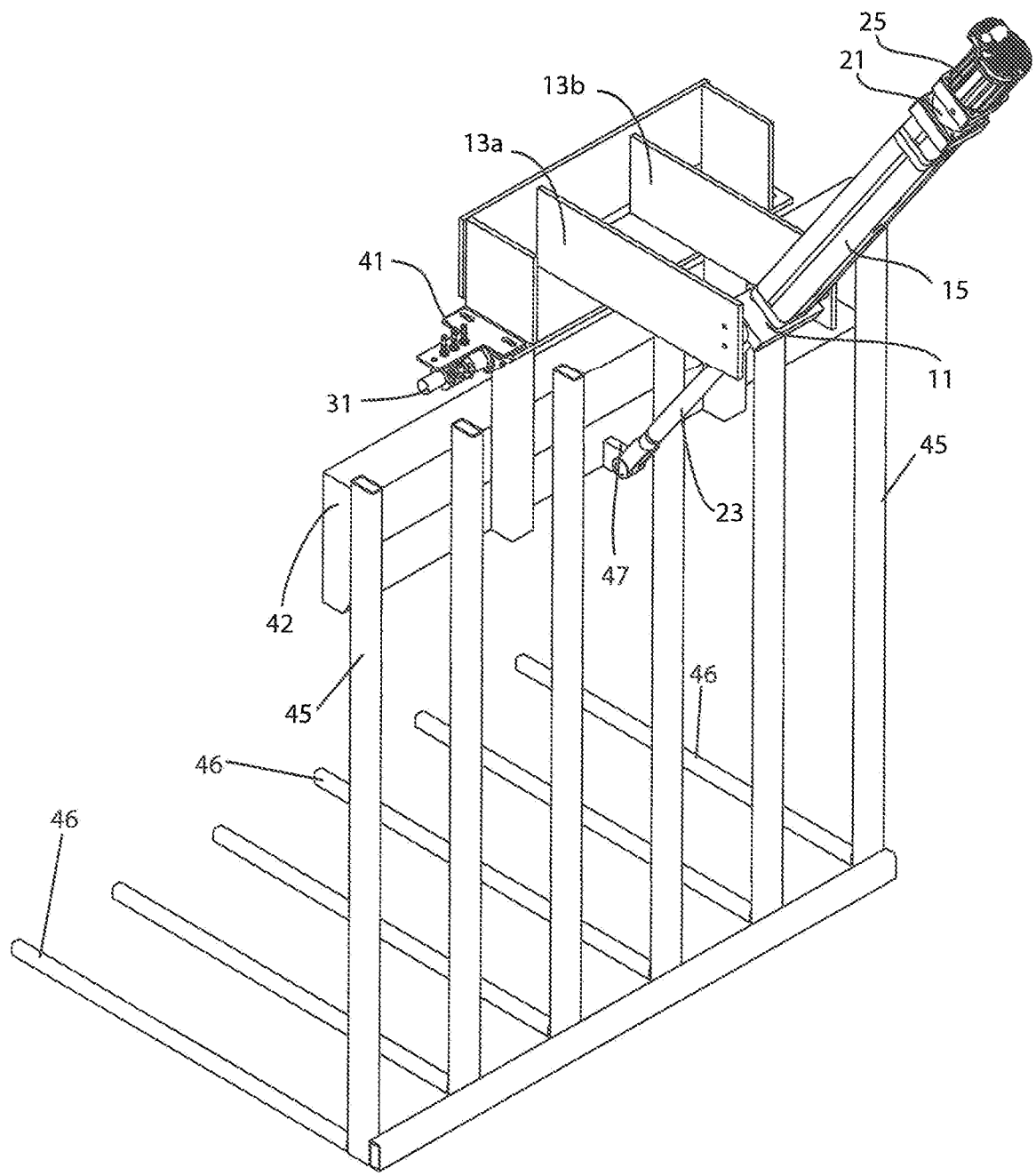
FIG. 13 is a perspective view of a fully extended chute frame assembly according to another embodiment of the present invention.
Figure 14:
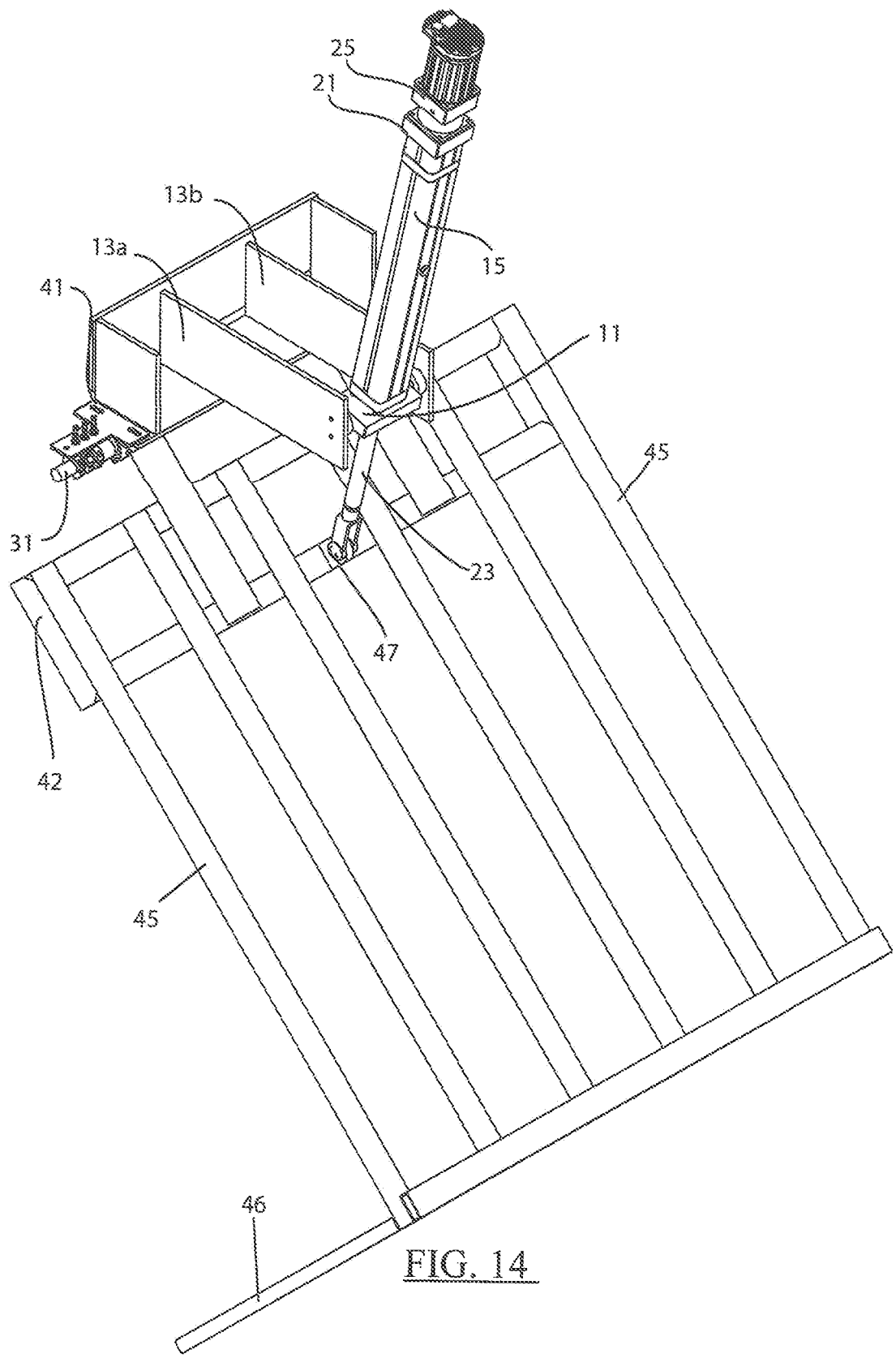
FIG. 14 is a perspective view of a partially extended chute frame assembly according to another embodiment of the present invention.
Figure 15:
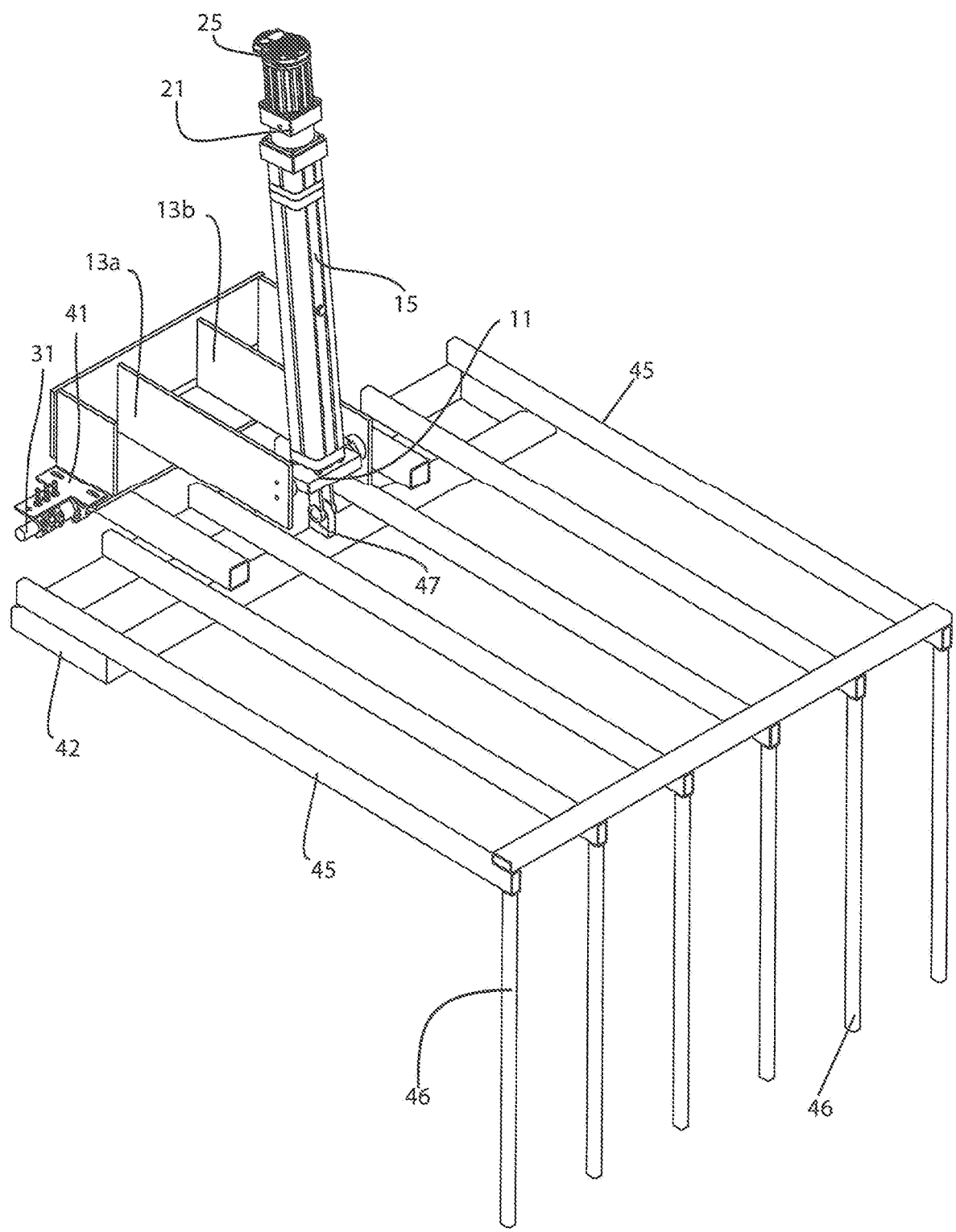
FIG. 15 is a perspective view of a fully retracted chute frame assembly according to another embodiment of the present invention.

Referring to the drawings wherein like reference characters designate like or corresponding parts throughout the several views, and referring particularly to FIGS. 8 and 9, it is seen that the illustrated embodiment of the present invention includes an electronic actuator 15 having a movable central shaft 23 that may be extended or retracted from the actuator. In some embodiments, shaft 23 may have helical edges such that it may be extended or retracted through rotation like a screw. An outer end of shaft 23 may be pivotally engaged with a clevis 47 attached to a chute frame 42. Frame 42 supports a plurality of strapping guides or tracks (chutes) 45 which correspond to chutes around the bale compression area. In some embodiments, chutes 45 may also include extension chutes 46 that are designed to fit under a compressed cotton bale, as shown in FIGS. 13-15. Straps may be sent through chutes 45 (and extensions 46, if present) in order to encircle a compressed cotton bale for tight engagement. The top of frame 42 may be pivotally mounted to the side of a baling machine using a shaft 49, such that extending shaft 23 out from actuator 15 will cause frame 42 and chutes 45 (with extensions 46, if present) to rotate down around shaft 49 to a lowered position, such as is shown in FIG. 8, 10 or 13. Similarly, retracting shaft 23 into actuator 15 will cause frame 42 and chutes 45 (with extensions 46, if present) to rotate up around shaft 49. When raised high enough, frame 42, chutes 45 (and extensions 46, if present) are moved out of the way so that a strapped bale of cotton may exit the machine. See FIGS. 12 and 15.

Embodiments of actuator 15 may include a motor 25 that may be used to rotate a helical shaft 23 to cause it to extend or retract, depending on the direction of rotation. For example and without limitation, rotating shaft 23 in a clockwise direction may cause it to extend out from actuator 15, and rotating shaft 23 in a counter-clockwise direction may cause it to retract into actuator 15. It is to be appreciated that in some embodiments these may be reversed, such that clockwise rotation causes retraction and counter-clockwise rotation causes extension. Actuator 15 may utilize an electronic (step) motor 25 which provides extremely precise positioning of shaft 23 when it is extended or retracted. Once motor 25 stops, it may act as a brake preventing further rotation of shaft 23 thereby preventing further extension or retraction of shaft 23, and preventing movement of frame 42 attached thereto. A brake 21 may be provided with actuator 15 as a backup to prevent slippage in the event of a failure of the braking provided by motor 25.

Figure 16:
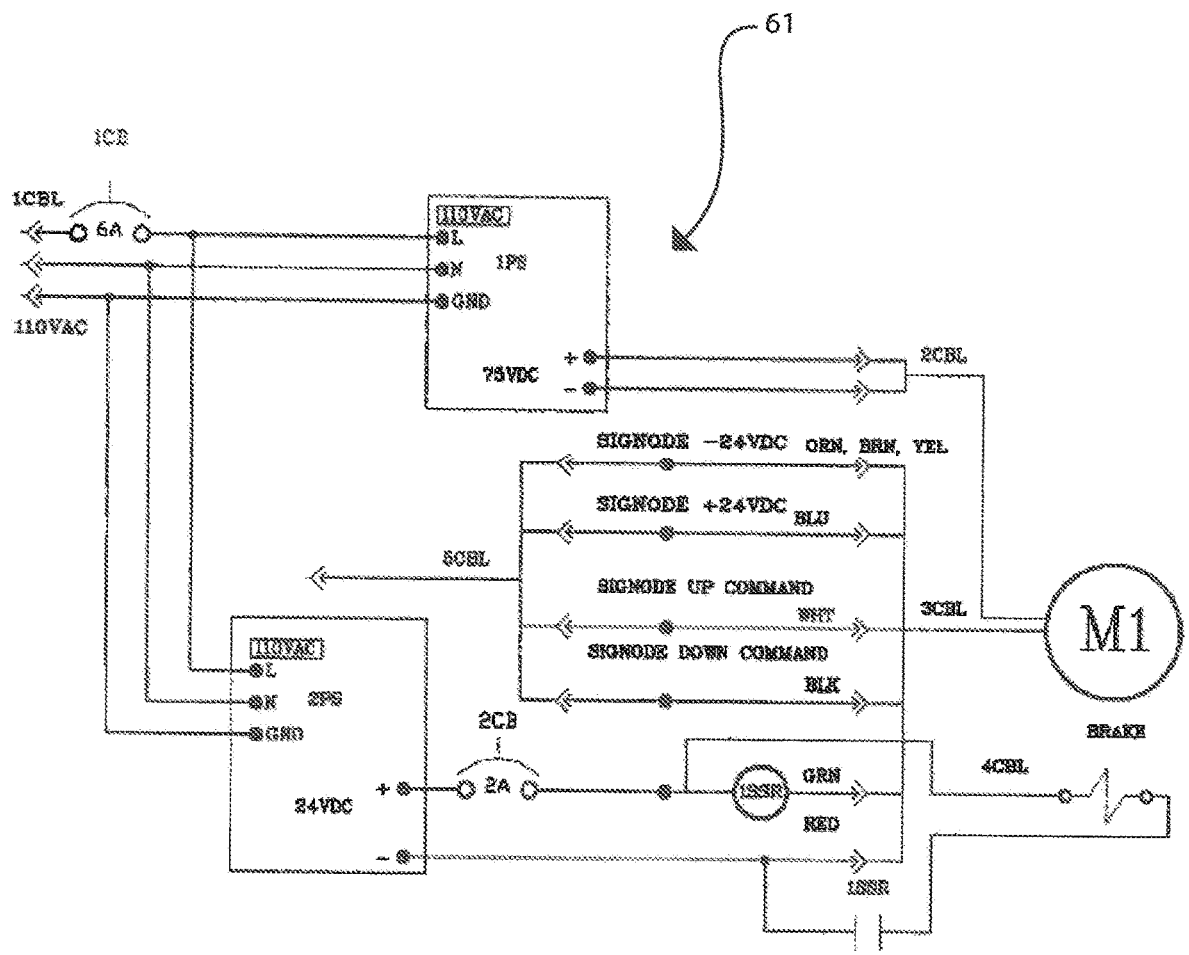
FIG. 16 is a circuit diagram of an embodiment of a controller of an embodiment of the present invention.

In some embodiments, the actuator motor 25 and brake 21 may be operated from an electronic controller 61, such as a programmable logic controller (PLC) as shown in FIG. 9, which communicates with the strapping controller of the cotton bailing machine. FIG. 16 illustrates an exemplary circuit for such a controller. In other embodiments, software, programming, and communication links may be installed directly into the existing controller of the bailing machine to communicate with these devices, as well as with the sensors described below.

In embodiments of the invention, the bottom of actuator 15 may be attached to a trunnion 11 using bolts or other fasteners that may be attached using openings 16. See FIG.

7. Trunnion 11 may also include a central opening 14 through which shaft 23 may extend and retract. Two side shafts or stubs 12a and 12b may extend from the sides of trunnion 11, and are designed to be pivotally mounted into corresponding openings on plates 13a and 13b. In some embodiments, plates 13a and 13b may already exist, along with the corresponding openings therein, which may have been used to support a pneumatic actuator that has been replaced by an embodiment of the present invention.

Figure 11:
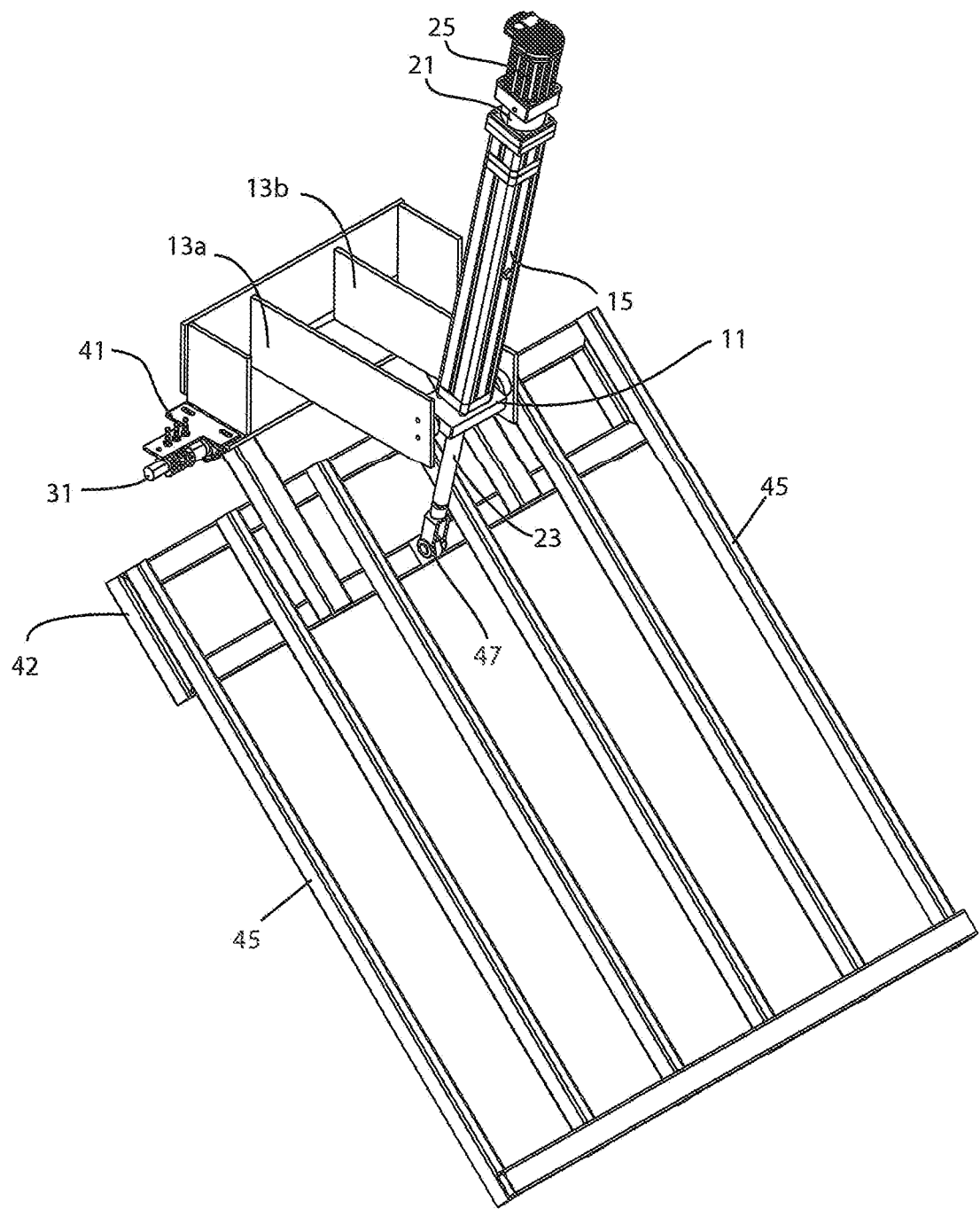
FIG. 11 is a perspective view of a partially extended chute frame assembly according to an embodiment of the present invention.

In most embodiments of the invention, there are three positions for frame 42 and chutes 45, which may or may not include extensions 46. The uppermost position of frame 42 is achieved by fully retracting shaft 23 into actuator 15. When fully retracted, frame 42 may be at or near a horizontal position, as shown in FIGS. 12 and 15. The lowermost position of frame 42 is achieved by fully extending shaft 23 out of actuator 15. When fully extended, frame 42 may be at or near a vertical position, as shown in FIGS. 8, 10 and 13. It is to be appreciated that a compressed, strapped bale of cotton may be prevented from exiting from the machine by the extensions 46 and/or chutes 45 of frame 42 when in the fully extended lowermost position. Thus, as soon as a plurality of straps are engaged around a bale of cotton, the controller and apparatus of the present invention cause frame 42 to be immediately raised out of the way to a fully retracted position, so that the strapped cotton bale may be discharged, as shown in FIGS. 12 and 15. Then, for efficiency, after the strapped cotton bale has exited the machine and while the next bale of cotton is being compressed, the controller may cause the actuator to partially extend shaft 23 so that frame 42 is in a partially extended position, with the ends of extensions 46 just outside of the compression area. See FIGS. 11 and 14. This saves time, in that once the next cotton bale has been compressed, frame 42 has only a short distance to travel to be fully extended for the next strapping operation, thereby taking less time between cotton bales.

Figure 1:
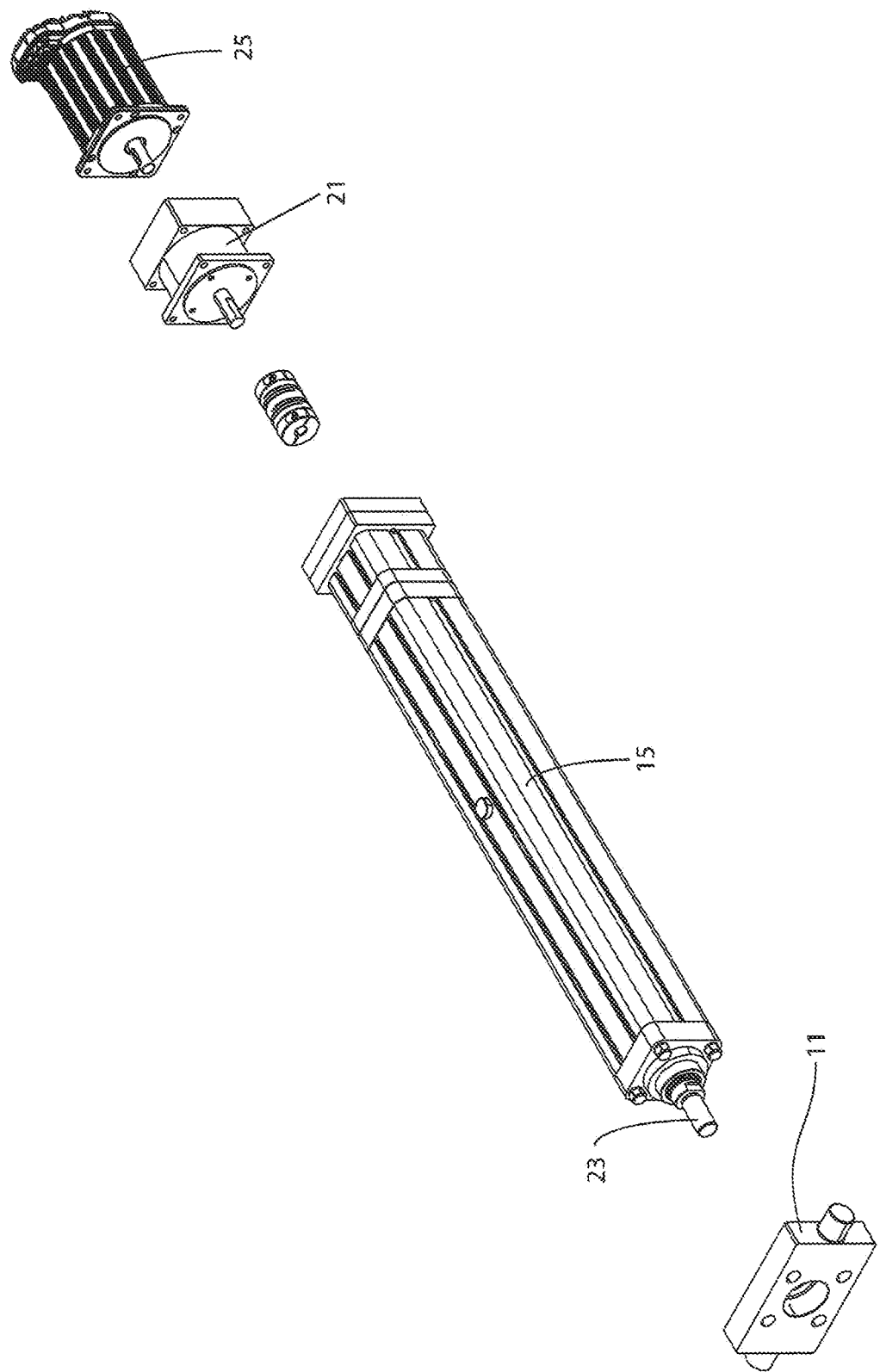
FIG. 1 is an exploded perspective view of an actuator according to an embodiment of the present invention.
Figure 2:
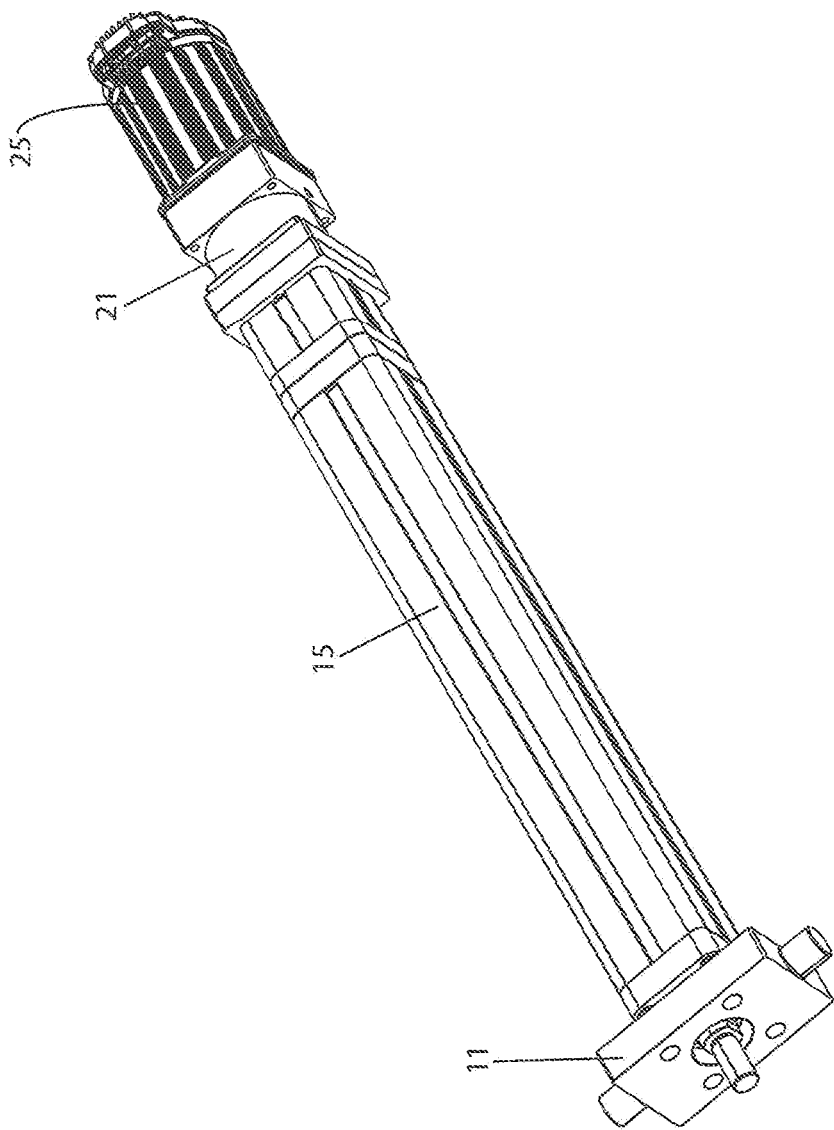
FIG. 2 is an assembled perspective view of the embodiment of FIG. 1.
Figure 3:
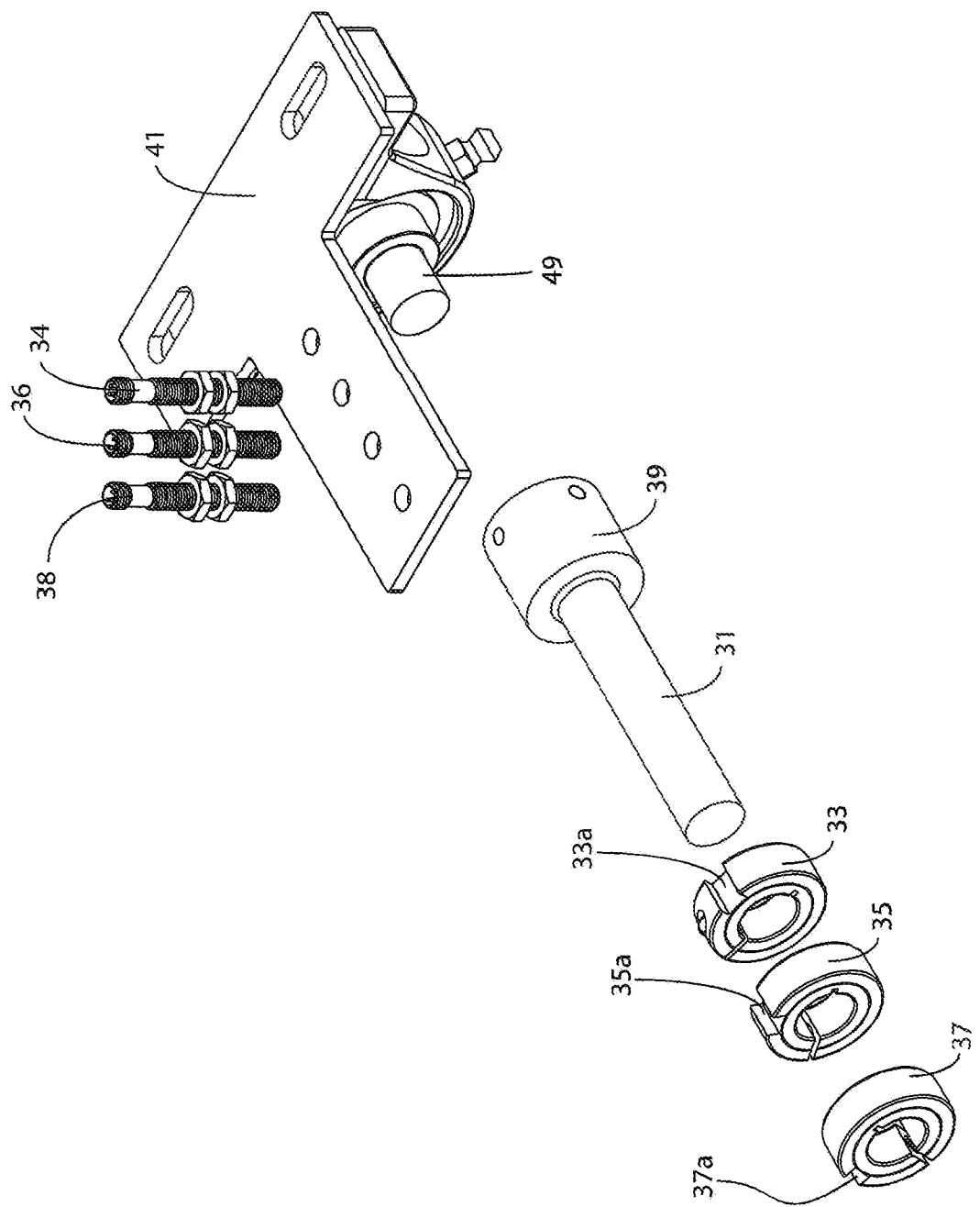
FIG. 3 is an exploded perspective view of a control shaft according to an embodiment of the present invention.

In the illustrated embodiment, the positions of frame 42 may be established using stops defined by a plurality of bearings 33, 35, 37 that may be located on shaft 31. It is to be appreciated that shaft 31 is collinear with shaft 49, and may be removably coupled thereto using a coupling or collar 39. Sensors 34, 36, and 38 may be associated with bearings 33, 35, and 37 as shown in FIGS. 4 and 5. Sensors 35, 36, and 38 may be mounted on a support member 41 so as to be adjacent to their associated bearings 33, 35, and 37. Each of the illustrated bearings 33, 35, and 37 is circular and fits around shaft 31 as shown in FIG. 3. However, in other embodiments, such as those shown in FIGS. 3A and 3B, other types of stops may be attached to shaft 31 such as without limitation tabs b, 35b, 37b, clips, or optically sensitive stickers 33 c, 35c, 37c. Each bearing 33, 35, and 37 may include a recess, slot, tab, optical sticker, or other surface feature 33a, 35a, and 37a that may be detected by its associated sensors 34, 36, and 38. The extension or retraction of actuator shaft 23 causes frame 42 to move, resulting in rotational movement of shafts 49 and 31. This also causes the stops of bearings 33, 35, and 37 to rotate. When the rotation of shaft 31 causes a recess, slot, tab or other surface feature 33a, 35a, or 37a to be detected by one of the sensors 34, 36, and 38, a signal is sent to a controller, which may cause the actuator shaft 23 to stop moving frame 42. Thus, the positions of the recesses, slots, tabs, stickers or other surface features 33a, 35a, and 37a may be used to determine the positions where frame 42 (and chutes 45 with extensions 46) will stop. It is to be appreciated that changing the positions of any of the recesses, slots, tabs, or other surface features 33a, 35a, 37a (e.g. by rotating its associated bearing 33, 35, 37 relatives to shaft 31), the locations of the positions where frame 42 is stopped may be changed.

In the embodiment illustrated in FIG. 3, a first stop 37a on bearing 37 defines the uppermost retracted position of frame 42. In this embodiment, when stop 37a is detected by sensor 38, a signal is sent, and the PLC may respond by stopping frame 42 from moving upward. The stops illustrated in this embodiment (33a, 35a, 37a) are recesses. Then, after a cotton bale exits the machine, and while the next bale is being compressed, frame 42 may be moved downward (rotating shafts 49 and 31) until the second stop 35a of bearing 35 is detected by sensor 36. When this is detected, another signal is sent, which may result in stopping the downward movement of frame 42 again, until the cotton bale is fully compressed. When compression is completed and the bale is ready for strapping, frame 42 may again be moved downward (rotating shafts 49 and 31) until the third stop 33a of bearing 33 is detected by sensor 34. When this is detected, another signal is sent, which may result in stopping the downward movement of frame 42 until the cotton bale is strapped. Afterward, frame 42 may again be moved upward (rotating shafts 49 and 31 in the opposite direction) until stop 37a on bearing 37 is detected by sensor 38, and the cycle may be repeated. It is to be appreciated that additional stops and sensors may be provided to cause shaft 49 to stop rotating at different places; and that fewer stops and sensors may be provided to eliminate stopping the rotation of shaft 49.

Figure 3A:
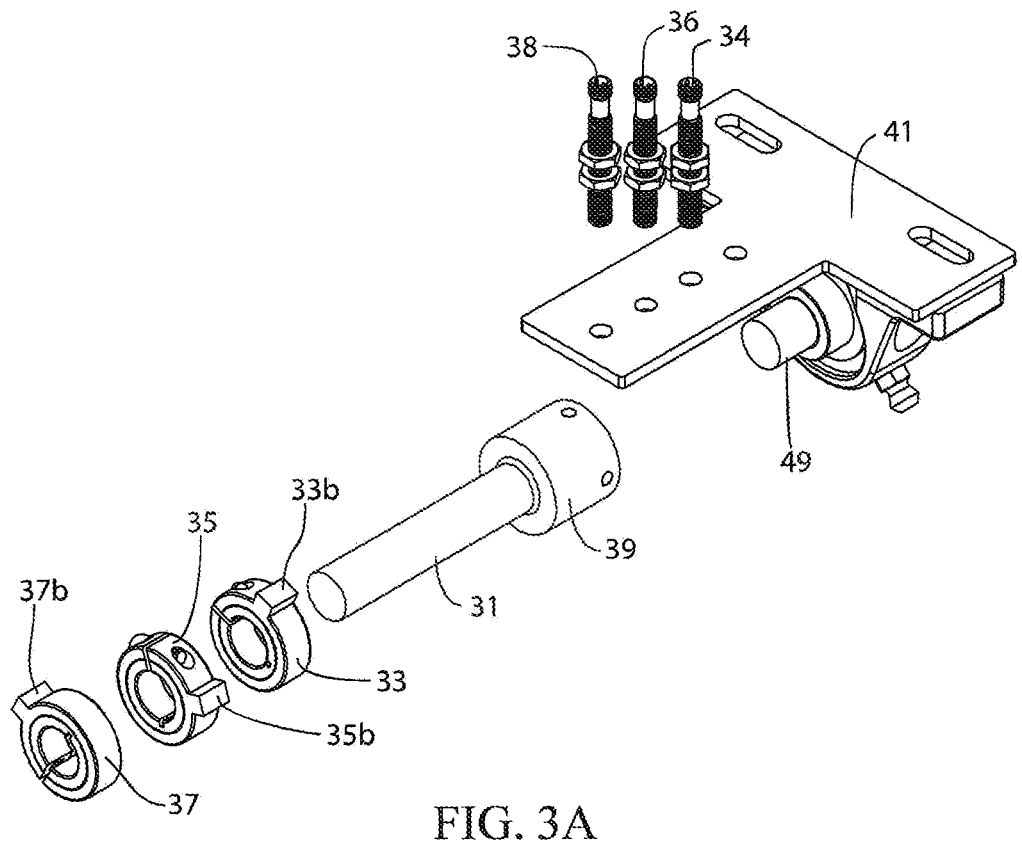
FIG. 3A is an exploded perspective view of a control shaft according to another embodiment of the present invention.
Figure 3B:
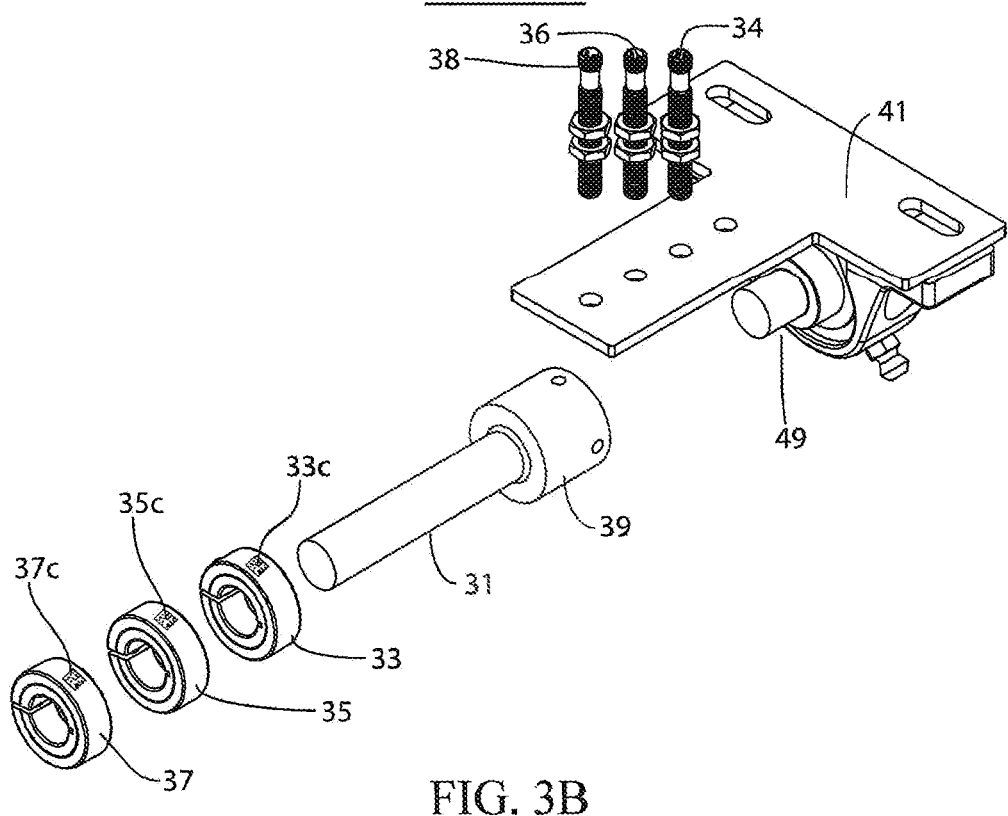
FIG. 3B is an exploded perspective view of a control shaft according to another embodiment of the present invention.
Figure 7:
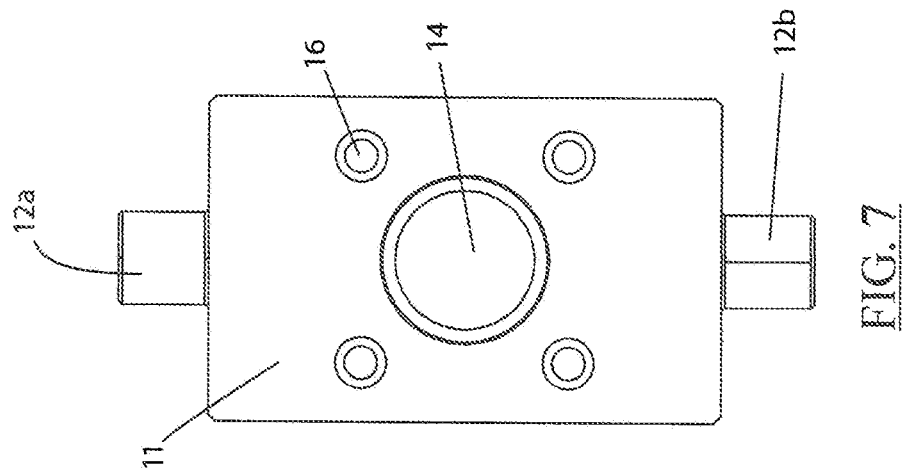
FIG. 7 is a top view of an embodiment of a trunnion of the present invention.
Figure 6:
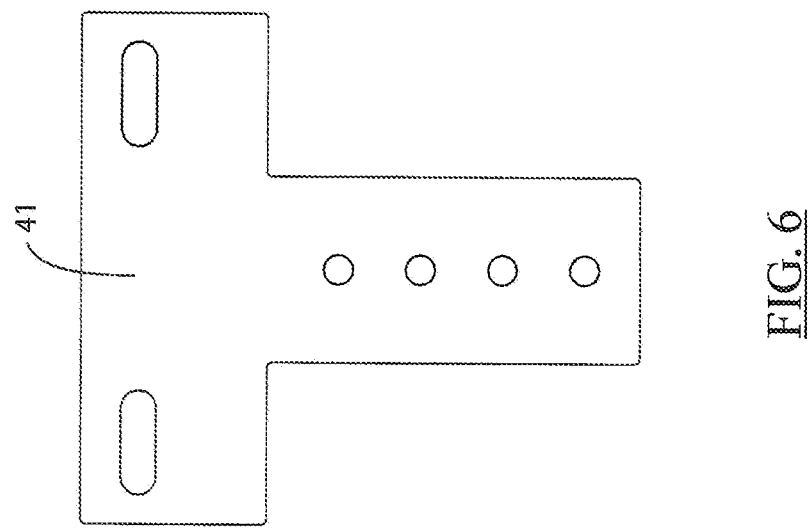
FIG. 6 is a top view of a T-shaped plate used with an embodiment of a control shaft of the present invention.

In the exemplary embodiment illustrated in FIG. 3A, the stops (33b, 35b, 37b) are shown as tabs. In the exemplary embodiment illustrated in FIG. 3B the stops (33c, 35c, 37c) are shown as optically detectible stickers.

The foregoing descriptions of specific embodiments of the present invention have been presented for purposes of illustration and description. They are not intended to be exhaustive or to limit the invention to the precise forms disclosed, and obviously, many modifications and variations are possible in light of the above teachings. The embodiments were chosen and described in order to best explain the principles of the invention and its practical application and to thereby enable others skilled in the art to best utilize the invention and various embodiments with various modifications as are suited to the particular use contemplated.

What is claimed is:

1. An assembly for positioning one or more strap chutes of a cotton baling machine comprising:
   a. a frame for supporting a plurality of strap chutes wherein an upper end of said frame is attached to a first shaft that is pivotally mounted on a side of the cotton baling machine;
   b. a trunnion pivotally attached between a pair of outwardly extending flanges located above the pivotal mount of said frame, said trunnion having a central opening therein;
   c. an electronic actuator attached to said trunnion, said actuator including a movable rod that extends through said opening and wherein an end of said rod is pivotally attached to said frame;
   d. a second shaft attached to and collinear with said first shaft;
   e. at least one adjustable stop provided on said second shaft;
   f. at least one sensor, said at least one sensor being associated with said at least one adjustable stop; and
   g. a controller in communication with said actuator and said at least one sensor.

2. The assembly of claim 1 further comprising an electronic motor attached to said actuator and in communication with said controller wherein operation of said motor causes the movable rod of said actuator to extend or retract.

3. The assembly of claim 2 further comprising a brake on said actuator in communication with said controller for preventing movement of said rod.

4. The assembly of claim 1 wherein said at least one adjustable stop comprises a surface feature that is detectable by said sensor.

5. The assembly of claim 4 wherein said surface feature comprises an optically detectable sticker.

6. The assembly of claim 1 wherein said at least one stop comprises a cylindrical bearing that may be engaged with said second shaft, said bearing having a surface feature that is detectable by said sensor.

7. The assembly of claim 6 wherein said surface feature comprises a recess in said bearing.

8. The assembly of claim 6 wherein said surface feature comprises a tab on said bearing.

9. The assembly of claim 6 wherein said surface feature comprises an optically detectable sticker on said bearing.

\* \* \* \* \*